Oct. 28, 1969 F. KURZWELL, JR., ET AL 3,475,734

TRACKING SYSTEM FOR DEFORMATION RECORDING

Filed Jan. 16, 1967 2 Sheets-Sheet 1

INVENTORS
FRED KURZWEIL, JR.
FRANK J. SORDELLO

BY Fraser and Bogucki

ATTORNEYS

INVENTORS
FRED KURZWEIL, JR.
FRANK J. SORDELLO
BY
Fraser and Bogucki
ATTORNEYS

United States Patent Office 3,475,734
Patented Oct. 28, 1969

3,475,734
TRACKING SYSTEM FOR DEFORMATION RECORDING

Fred Kurzwell, Jr., Saratoga, and Frank J. Sordello, San Jose, Calif., assignors to International Business Machines Corporation, Armonk, N.Y., a corporation of New York Filed Jan. 16, 1967, Ser. No. 609,373
Int. Cl. G11b *5/00;* G01d *15/02;* H04n *5/76*
U.S. Cl. 340—173 17 Claims

ABSTRACT OF THE DISCLOSURE

Signals generated by detectors spaced in spatial quadrants relative to an electron beam scanning a three-dimensional thermoplastic recording track are processed in AC circuits to generate a servo control signal indicative of extent and sense of deviation of the beam from the track center. Signals from detectors in in-line and quadrature positions are phase shifted into phase alignment, and the peak-to-peak value of the in-line component is subtracted from the peak-to-peak value of the sum of the in-line and quadrature components to derive a bipolar control signal.

BACKGROUND OF THE INVENTION

Field of the invention

This invention relates to high density systems for recording and reproducing digital data, and more particularly to systems for controlling beam position during scanning of a deformation pattern.

Description of the prior art

One widespread trend in the development of digital data processing systems has involved data storage systems in which extremely high capacity is achieved at the cost of increased access time. Early systems of this nature were of the magnetic drum and disk types using fixed or movable transducers, with access time being required for positioning the transducers, rotation of the drum or disk, or both. In order to further increase storage capacity, magnetic sheet and card systems have been developed in which any one of a number of cards retained in a cylinder may be extracted for data transfer and returned rapidly to position. By utilizing various physical dispositions for the sheets of cards, together with high speed mechanisms for locating and utilizing the given storage member, extremely high storage capacity has been attained. Although electrostatic and other recording techniques have been proposed and utilized for these systems, the great majority of all such random access memory systems employ magnetic recording and reproduction techniques. Relative movement must be introduced between the record member and the transducer, and well-known mechanical and electrical circuit limitations are imposed on the apparatus. By utilizing appropriate modulation techniques, it is feasible to record and reproduce magnetic patterns having densities of the order of 1,000 to 2,000 bits per inch. Of the order of 100 tracks per inch can be utilized, if adequate care is taken to limit the skew of the recording member and precision head designs are used. Further increases in recording density are possible but are not readily feasible, both because of the requirements imposed on transducer design and because of cross-talk between the adjacent channels during recording and reproduction. In any event, the data readout rate is limited to what can be achieved given the data density and the rate of movement between the transducer and record member.

Increasing the recording density, both the bits per inch along a track and the number of tracks per inch, is a constant objective due to the fact that access time and cost per bit are both thereby reduced. Substantially greater densities than in magnetic recording systems can be achieved by thermoplastic recording systems, in which minute incremental areas of a thermoplastic recording member are deformed in predetermined patterns in response to a modulated electron beam. A digital data track is formed consisting of a series of depressions, the data from which may ultimately be reproduced by appropriate means. Bit densities of 1–2,000 bits per inch, and track densities of 1,000 tracks per inch are readily achievable, so that a 1-inch square of recording material may contain 1–2,000,000 bits of information. This small area may be scanned by wholly electronic means for readout. Consequently, the design of a high capacity random access memory is greatly simplified, because the mechanical system is only required to place the selected storage surface in reading position.

The readout mechanisms used with thermoplastic recording may be light-responsive or electron-beam responsive, with the latter technique being preferred for digital data. In electron beam readout mechanisms, an array of four separate electron detectors is generally employed, with two facing detectors, hereafter referred to as in-line detectors, being disposed along the track axis, and two orthogonally related detectors, hereafter referred to as quadrature detectors, being disposed along an axis transverse to the track axis. A selected area of storage surface is disposed under the readout mechanism, and the electron beam is scanned along the selected track. The in-line detectors provide signals responsive to the data on the track and the quadrature detectors provide signals responsive to the transverse displacement of the electron beam relative to the track. The same principles are applicable to some light-responsive detectors using in-line and quadrature photon detectors.

Precise center tracking of the recorded patterns is highly desirable, in order to achieve high signal-to-noise ratios as well as to limit the possibility of loss of the selected track. For this purpose, most systems generally employ high gain, wideband servos responsive to the DC component of the signal from the quadrature detectors, and directing the electron or light beam so as to tend to scan along the center of the track. Such systems, however, are subject to serious drift problems which limit achievable track density or require servo circuits of substantial complexity to overcome the drift problems.

SUMMARY OF THE INVENTION

The purposes of the present invention are achieved by a system that introduces an AC component into the recorded data, then combines the signal from the in-line detectors and the quadrature detectors in the readout mechanism, to provide an AC signal from which the error signal is extracted by using the AC component as a phase reference.

In a specific example of a system in accordance with the invention, data recorded on a thermoplastic recording medium is phase modulated, such that each binary digit is denoted by at least one transition in the recorded signal. A scanning readout mechanism employing two in-line detectors and two quadrature detectors is scanned along a given track. The paired signals are first combined separately in differential amplifiers to provide compensated AC in-line and quadrature signals. A 90° phase difference arising from the spatial relationship of the detectors is eliminated by suitable phase shift means, but a variable phase relationship remains, shifting from directly in-phase to out-of-phase dependent upon the lateral position of the beam relative to the center of the track. To extract the needed information as to the extent and sense of beam deviation, the AC in-line and quadrature signals are summed and the envelope or peak-to-peak value of this signal is detected in one channel. The in-line component is sufficiently large relative to the quadrature component to dominate as the phase relation changes between the in-phase and out-of-phase states. The in-line AC component is then envelope detected in a second channel, and the resultant DC signal subtracted from the signal in the first channel to provide a bipolar control signal whose polarity indicates the sense of the deviation and whose amplitude indicates the extent of the deviation from the center track position.

BRIEF DESCRIPTION OF THE DRAWINGS

Objects and advantages other than those indicated above will be apparent from the following more particular description of a preferred embodiment of the invention, as illustrated in the accompanying drawings.

DESCRIPTION OF THE PREFERRED EMBODIMENT

Figures 1, 2:
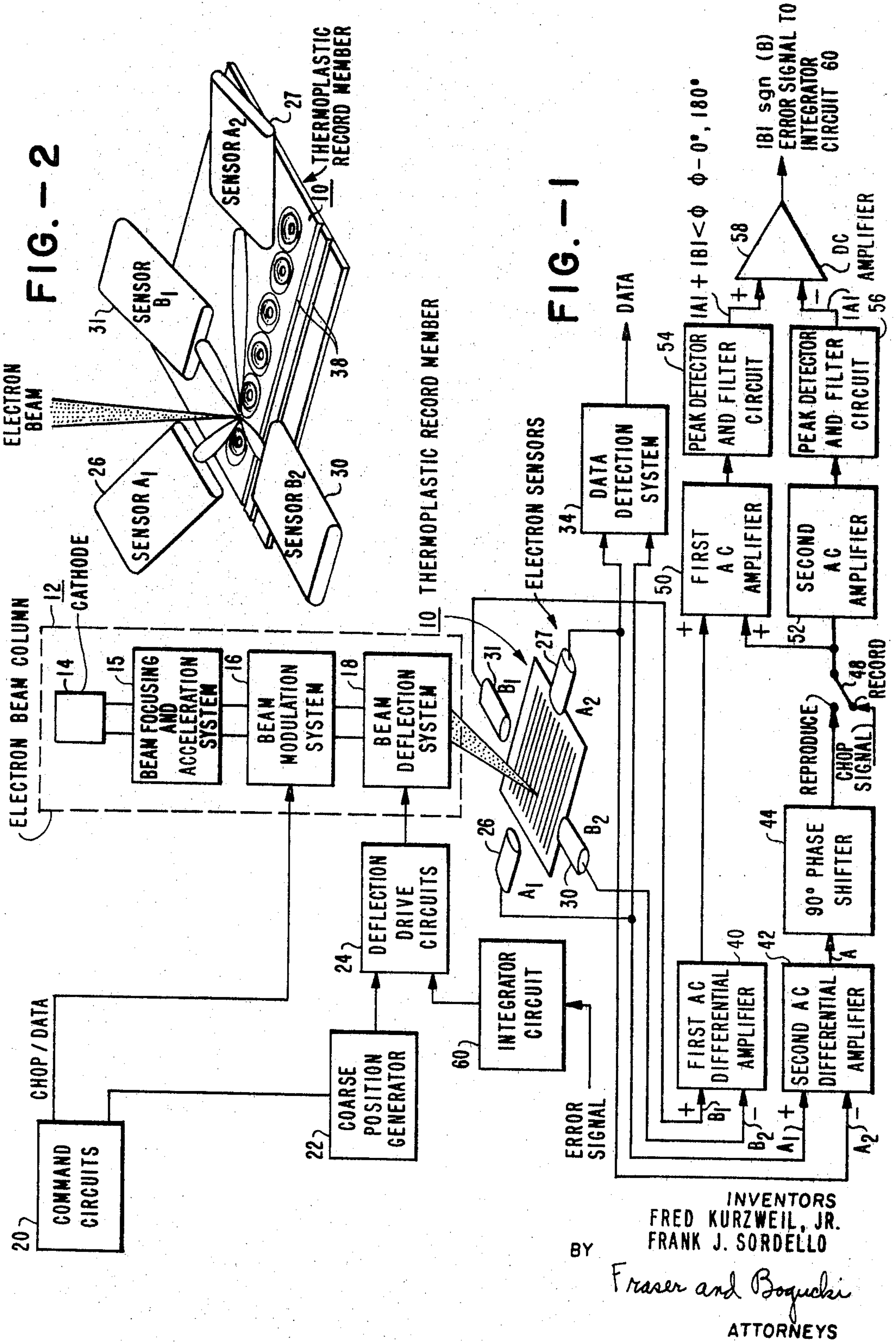
FIG. 1 is a combined simplified perspective and block diagram representation of a system in accordance with the invention.
FIG. 2 is an enlarged and simplified fragmentary representation of a portion of an electron beam readout mechanism for the arrangement of FIG. 1.

A data recording and reproducing system for thermoplastic records, employing a tracking system in accordance with the invention, is shown in simplified form in FIG. 1. A thermoplastic record member 10 is shown in exaggerated size relative to an electron beam generating and control system and an electron beam readout system. Inasmuch as conventional beam generation, modulation and readout systems may be used, the operative elements are shown only in general and idealized form in FIG. 1. Although an electron beam readout system is shown, the applicability of the concepts of the invention to a light beam readout system will be evident.

The electron beam column 12 includes a cathode 14 and a beam focusing and acceleration system 15 (not shown in detail) and generates a narrow, high velocity beam of electrons directed within a vacuum enclosure (not shown) toward the thermoplastic record member 10. A beam modulation system 16, such as a conventional beam intensity control grid, is interposed in the path of the beam, as is a beam deflection system 18, which may be of the electrostatic or electromagnetic type.

During recording and reproduction, the generated electron beam is caused to scan the thermoplastic record member 10 at high speed and along closely spaced tracks. Although the thermoplastic record member 10 may be a continuous web or tape, and the invention is useful with such record members, a random access memory will be assumed as the operative context. For example, randomly accessed storage chips of the order of 1-inch square can be manipulated within an appropriate random access mechanism (not shown) to be presented at the readout position in millisecond intervals. The least complex systems merely dispose chips on a rotatable disk or drum which can be rotated to fixed rotational positions, and can in some instances be shifted in other directions as well for greater storage capacity. More complex systems dispose the chips within cells, from which they are withdrawn and moved to the readout position.

A data processing system is in the great majority of instances utilized to control the recording and reproduction modes and provides the necessary commands as to the tracks to which access is to be had for the appropriate function of the random access system. For simplicity, these associated general purpose or special purpose controls are designated simply as command circuits 20. The command circuits 20 provide track selection control signals to a coarse position generator 22 that operates the deflection drive circuits 24, to position the beam at selected individual tracks on the thermoplastic record member 10. Fine adjustment of the beam in the direction transverse to the tracks is effected by servo signals from a tracking system in accordance with the invention coupled to the deflection drive circuits 24 controlling the beam deflection system 18. Scanning along the track is controlled by conventional sweep circuits and is not described in detail.

The beam readout system comprises four fixed electron beam sensors 26, 27 and 30, 31. Two of the sensors 26 and 27 are the in-line sensors $A_1$ and $A_2$, inasmuch as they face along the record tracks, to sense radiation moving parallel to the track. The remaining two detectors 30 and 31 are the quadrature detectors $B_1$ and $B_2$, and are positioned to sense radiation moving in the transverse direction relative to the track. As described below in more detail, pairs of sensors are used along each axis to equalize variations from the individual sensors arising from changes in beam position and direction.

The signals from the in-line sensors 26, 27 are applied to a data detection system 34 including conventional preamplifiers, signal shaping circuits and decoding circuits (not shown). The remainder of the system shown in FIG. 1 is concerned with the tracking system in accordance with the invention, by means of which the electron beam is maintained in the center of a selected track. Reference should also be made in this conjunction to the enlarged simplified diagram of the electron beam readout arrangement shown in FIG. 2. Digital data is there shown to be recorded as a sequence of depressions in the record member 10, these depressions extending along a selected track axis. In accordance with the thermoplastic principle, the depressions are formed during recording by modulating the electron beam during scanning to deposit electrons in selected patterns on incremental areas of the record member 10. The record member is prepared such that the charge patterns determine subsequent thermoplastic deformation upon heating, leaving a three-dimensional digital data record. Details of the construction of the record member and the deformation process have been omitted for brevity.

On readout by an electron beam, the radiation emanating from the record member 10 at any instant in time is determined, in each of the four cardinal directions, by the physical disposition of the record member 10 surface at the point at which the electron beam is impacting. Broadly speaking, the electron beam reflects off the sides or bottom of a depression in optical fashion. For purposes of tracking during recording, previously prepared grooves 38 are included along the record member 10, in desired track positions.

In the tracking servo system, the signals from the in-line detectors 26, 27 are combined in a second AC differential amplifier 42, and the signals from the quadrature sensors 30, 31 are applied to a first AC differential amplifier 40. When the electron beam is reflected at a like angle to both sensors of a pair, the signals from the two sensors are of some intermediate amplitude (relative to their maximums) and substantially equal in amplitude. As the electron beam shifts to reflect more directly toward one of the sensors, the amplitude of the signal from that sensor is increased and the amplitude of the signal from the other sensor is decreased. By combining these signals in opposite polarity (push-pull) relationship, as shown, output signals for the in-line and quadrature components remain substantially independent of variations in the scanning position of the beam. Paired detectors need not be used where the beam angle is not substantially varied or the detector output is equalized in other ways.

As is described in greater detail below, a fixed 90° phase difference between the in-line and quadrature signals is compensated for by a 90° phase shifter coupled to the second AC differential amplifier 42. The in-line signal is brought into proper phase relation with the quadrature signal although as described below they will still vary from directly in-phase to directly out-of-phase relationships.

The same tracking system may be used during recording, but operates by using an AC component in the electron beam itself in conjunction with the pregrooved tracks 38 in the record member 10. During record, the common circuits 20 provide a high frequency chopping signal representing the common mode component to be used in tracking. This chopping signal is applied to the beam modulation system 16 and also to the tracking circuits. The frequency of this chopping signal is substantially higher than the frequency or data rate of the signal being recorded, and typically should be at least an order of magnitude greater. A single-pole, two position switch 48 controlled from the command circuits 20 is coupled to the output terminal of the 90° phase shifter 44 during the reproduce mode, and switched to receive the chopping signal during the record mode.

Whether reading or writing, a common mode AC component is utilized in the same fashion, and only the reproduce function need be described in detail. The in-line (data) and quadrature signals, designated A and B, respectively, thus appear in two signal channels. The phase-shifted A and B signals are additively and linearly combined in a first AC amplifier 50. The A signal alone (or the high frequency reference signal if in the record mode) is amplified in a second AC amplifier 52. The envelopes of these two AC waveforms are extracted in peak detector and filter circuits 54, 56 respectively. These circuits 54, 56 exemplify conventional circuits that may be used to provide DC signals representative of the variations in the unipolar peak amplitude of the AC signals. Rectifier and low pass filter circuits may also be used. The summed DC signal from the first peak detector and filter circuit 54, and the DC signal from the second peak detector and filter circuit 56 are applied to the two inputs of a DC amplifier 58 in opposite polarity relationship, so that one is subtracted from the other. The resultant bi-polar DC component is then smoothed in an integrator circuit 60 coupled to control the deflection drive circuits 24.

Figure 3:
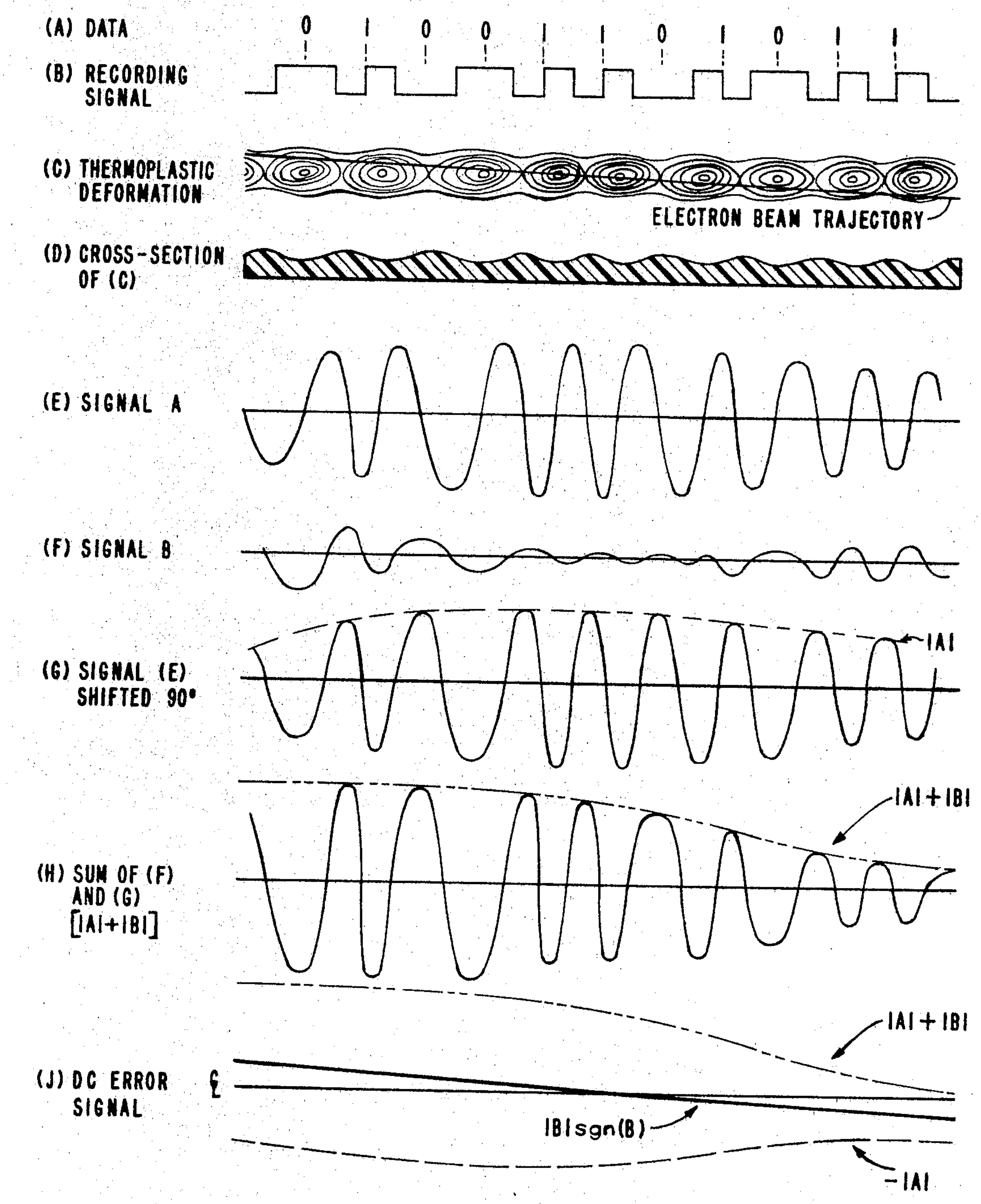
FIG. 3 is a graphical representation of sequences of digital data, digital recording patterns and various waveforms illustrative of changing states at various units in the system of FIGS. 1 and 2, and useful in explaining the operation of the system.

An appreciation of the variation in signals at the sensors 26, 27 and 30, 31 in correspondence to the three-dimensional geometries of the depressions along a data track on the thermoplastic record member 10 will facilitate understanding of the system operation. Reference may be made to FIG. 3, in which the data sequence is related to the recorded pattern and to various waveforms arising subsequently in the system. The binary data sequence is represented at A, and the encoded equivalent for recording purposes is represented in waveform B. This encoded equivalent is generally referred to as double frequency recording. Double frequency recording is one form of phase modulation recording, and uses a bi-level signal variation in which clock times and data states are represented by signal transitions from one level to another. For each data increment or binary digit a transition occurs at the clock time, or start of the interval. For binary "1" values, however, a transition to the opposite level occurs midway within the data interval, whereas no transition occurs until the opposite clock time for the binary zero value. The opposite convention can, of course, also be employed for the binary 1 and 0 values. This is referred to as double frequency recording because the duration of an individual cycle is either $1/f$ or $1/2f$.

As seen from a comparison of waveform B with the simplified graphical representation C of the thermoplastic deformation pattern along a track, modulation of the electron beam during writing in accordance with waveform B provides a directly related deformation pattern. Depression nodes are formed at points corresponding to the midpoints of the positive-going pulses (high intensity beam) in the signal wave train. The length of the depression is determined by the duration of the positive-going pulse, or actually the length of time that the energizing electron beam is at high intensity as it scans along the track. These depressions are shown as they may be seen in cross section in graphical representation D in FIG. 3.

By visualizing an electron beam impacting a depression vertically downwardly in representations C and D, it will be noted that the scattering of the beam in the four cardinal directions relative to the track axis varies in different ways as between the paired in-line sensors 26, 27 and the paired quadrature sensors 30, 31. The electron beam trajectory of waveform C is assumed to skew from one side of the track to the other. Assuming for the sake of simplicity that the electron beam path is directly vertical relative to the depressions, the angle of reflection from the point of incidence within a depression is dependent upon the slope at that point. The primary component in the A or in-line signal is the AC component or short term amplitude modulation introduced as a result of variations relative to the plane of the record member extending along the axis of the track. At points of zero slope, i.e., points at which a node or a peak is parallel to the plane of the record member, the beam is reflected back vertically, so that these peak and node points correspond to zero crossings in the AC wave. Conversely, the points of maximum slope within the depressions correspond to the positive and negative peaks in the AC wave. A secondary modulation also exists, because when the electron beam trajectory is off center relative to the track, the electron beam impacts on the sloping sides of the depression, transversely displaced from the center of the track, so that reflection in the in-line direction is reduced. Thus, there is additionally a long term amplitude modulation component in the AC data wave, as may be seen in waveform E. Waveform E, for ease in visualizing the generation of signals, is shown as representing the combined in-line signal A.

Waveform F represents the signal generated at the quadrature detectors, which signal is both phase and amplitude modulated in accordance with the position of the beam relative to the track axis. The controlling slope in the generation of these signals, however, is the slope in the direction transverse to the axis of the track. Therefore, as long as the beam is directed at a horizontal node, its maximum signal deviation occurs in the region of the midpoint of a depression, or, stated in another way, is in phase with the variations in depth in the depressions. When on the center of the track axis, the side scattering toward the quadrature sensors is equal and, is as shown in waveform, F, the AC wave has minimum fluctuation about its reference level. Because the direction of the slope reverses, dependent upon the side of the track axis upon which the beam impinges, the generated AC wave is shifted 180° on phase when the beam shifts from one side of the center line to the other.

Bearing these factors in mind, reference may now be made to FIGS. 1 and 3 for a better understanding of the operation of the servo control for beam deflection during data reproduction. The in-line (A signal) components from the sensors 26, 27 are applied to the second AC differential amplifier 42 to provide a combined signal like that of waveform E in FIG. 3 for the corresponding data pattern. The quadrature (B signal) components are applied to the first AC differential amplifier 40 to generate a combined signal like that of waveform F in FIG. 3. The wave from the second AC differential amplifier 42 is shifted 90° in the phase shifter 44, so as to place this waveform G in proper phase relation (either coincidence or opposition, depending upon the B signal) to the signal from the first AC differential amplifier 40. The amplified signals are adjusted, if necessary, such that the peak-to-peak value of signal A is substantially greater than the peak-to-peak value of signal B. Thus, when the signals from the two channels are summed in the first AC amplifier 50, a combined waveform is generated as shown in waveform H. Signal A is correspondingly amplified in the second AC amplifier 52, but is unchanged in character from waveform G. To this point in the system, the applied signals are processed in AC form, and, as is well known, present no significant stabilization or drift problems. The envelopes, specifically the unipolar peak-to-peak values of the summed signals and the A signal are thereafter recovered in the first and second peak detector and filter circuits 54, 56 respectively. The resultant signals correspond to the dotted line representations in waveforms H and G respectively. When the A signal is subtracted from the summed signal in the DC amplifier 58, a bi-polar control signal is generated as shown by waveform J. The phase modulation information in the quadrature component is thus related in time to the phase of the common mode component represented by the A or in-line signal to identify the sense of the deviation in terms of the polarity of the DC signal. The amplitude of the quadrature component represents the extent of the positional error. Thus this bi-polar signal may be passed through the integrator circuit 60 to correct the position of the electron beam.

This error signal generating system extracts the tracking error information by utilizing several factors. First, coarse positioning is controlled by the separate coarse positioning control circuits, because no positioning information is available when the beam leaves the thermoplastic deformation pattern. Second, the unipolar peak-to-peak value of A, or |A|, is made greater than the unipolar peak-to-peak value of B, or |B|. Third, the value of |A| does not change substantially as the beam skews between the control range limits. Fourth, there is a phase difference of 0° or 180° between the A and B signals after 90° phase shift. Thus, the summation of A and B signals while they are in the AC mode, and the subsequent subtraction of the peak-to-peak value of the A signal from the peak-to-peak value of the B signal derives the desired bipolar error signal |B| sgn (B).

When operating in the write mode to record data, the pregrooved track 38 (FIG. 2) on the record member 10 is utilized in conjunction with the high frequency chopping signal from the command circuits. Thus the AC signal contained in both the in-line and quadrature signals is generated within the electron beam system, independently of the data. This carrier component is modulated in phase and amplitude, dependent upon the beam trajectory relative to the track center, and the modulated signals are derived by the quadrature detectors. Thereafter, in the tracking control circuits, the signals are processed in the two channels to derive the needed servo error signal for control of the beam position, despite the fact that some modulation components are concurrently provided due to modulation of the beam intensity with the data.

Methods in accordance with the invention utilize the steps of scanning a three-dimensional record pattern with a beam in a fashion to provide an inherent AC component of at least one frequency. One AC signal modulated in accordance with the tracking position during scanning is generated to provide information as to the extent and sense of the deviation, in terms of amplitude and phase reversal modulation respectively. A second AC signal provides the inherent AC component as a reference. The two AC signals are summed with the second AC signal predominating. DC signals representative of the envelopes of the summed and second AC signals are derived, and subtracted to provide information as to the sense and extent of deviation of the beam from a central position on the record pattern. Thus, after the summed signals and the phase reference are converted to DC signals, the phase reference-representative signal component is subtracted to provide a signal containing position and direction information.

While the invention has been particularly shown and described with reference to an embodiment thereof, it will be understood by those skilled in the art that various changes in form and details may be made therein without departing from the spirit and scope of the invention.

What is claimed is:

1. A tracking control signal generating system for an electron beam scanning system for thermoplastic recordings, including:

in-line and quadrature detectors generating sensing signals;

means associated with electron beam scanning system for introducing an AC component into the sensing signals;

AC signal summing circuits responsive to the sensing signals;

and DC signal generating circuits responsive to DC components of the sum of the signals from the sensing circuits and at least one of the sensing signals, and generating a tracking control signal representative of the difference therebetween.

2. A system for generating a signal to control a radiant energy beam providing variable radiation patterns while scanning along a three-dimensional record medium, comprising:

means associated with the radiant energy beam for introducing an AC component into the radiation patterns;

means disposed in different positions relative to the beam for sensing radiation from the record medium in at least two orthogonally related directions;

AC means responsive to the sensed radiation for generating an AC summation of the AC signals derived from the two orthogonally related directions;

and DC means responsive to the difference between selected DC components of the AC summation and one of the AC signals for providing a control signal.

3. The invention as set forth in claim 2 wherein the means for introducing an AC component comprises a frequency modulated recorded pattern.

4. The invention as set forth in claim 2 wherein the means for introducing an AC component comprises a pregrooved record track and means for chopping the radiant energy beam at a frequency substantially greater than the frequency of the data being recorded.

5. A system for generating a control signal in response to the sensing by in-line and quadrature detectors of the position of a scanning beam relative to a digital data track on a thermoplastic recording member, comprising:

means introducing a reference frequency component into the in-line and quadrature signals;

means responsive to the reference frequency component for shifting said component into selected phase relation to the quadrature signals;

AC amplifier means for additively combining said in-line and quadrature signals;

means for extracting the unipolar peak-to-peak values of the additively combined and in-line signals;

and means for subtracting the peak-to-peak values to provide a bipolar control signal.

6. The invention as set forth in claim 5 above wherein the reference frequency component is presented as a phase modulation component in the recorded deformation pattern.

7. The invention as set forth in claim 5 above wherein the reference frequency component is introduced by means for modulating the beam intensity with a high frequency signal and wherein the thermoplastic record member has a pregrooved track.

8. A system for controlling an electron beam during scanning of a thermoplastic deformation record containing frequency modulated digital data comprising:

first detector means developing AC in-line signals;

second detector means developing AC quadrature signals;

means responsive to the in-line signals for introducing a 90° phase shift therein;

AC means responsive to the phase shifted in-line signals and the quadrature signals for additively combining said signals;

means responsive to the combined signals for extracting the unipolar peak-to-peak value thereof;

means responsive to the in-line signals for extracting the unipolar peak-to-peak value thereof;

DC amplifier means responsive to the difference between said peak-to-peak values for generating a bipolar control signal therefrom;

and electron beam deflection control means responsive to the control signal.

9. The invention as set forth in claim 8 above wherein the first detector means comprises a pair of detectors, the second detector means comprises a pair of detectors, and the system further includes first and second AC differential amplifier means for differentially combining each pair of in-line and quadrature signals into separate signals.

10. The invention as set forth in claim 9 above wherein the in-line signals are of greater peak-to-peak magnitude than the quadrature signals when combined, and wherein the in-line signals are not substantially amplitude modulated because of the beam positional variations within the tracking range.

11. A system for controlling scanning of a radiant energy beam relative to a three-dimensional data record comprising the combination of directionally controllable radiant energy means;

in-line and quadrature radiant energy detector means positioned adjacent the data record for sensing signal variations representative of data and positional error respectively;

means providing at least one AC reference frequency component in the detected signals;

means responsive to the detected signals for summing the sensed quadrature signal and the AC reference frequency component in phase relation;

means responsive to the summed signal and the in-line signal for deriving DC signals separately representative thereof;

means responsive to the DC signals for developing a difference signal therefrom;

and means responsive to said difference signal for controlling the directionally controllable radiant energy means.

12. The invention as set forth in claim 11 above wherein the DC signals are unipolar peak-to-peak values, wherein the peak-to-peak value of the quadrature signal is less than the peak-to-peak value of the in-line signal, wherein the in-line and quadrature signals are shifted 90° in phase relative to each other to provide the proper phase relation, wherein the beam is an electron beam, wherein the means for an AC frequency component comprises a double frequency digital data recording pattern, wherein the radiant energy detector means comprise opposed pairs of electron beam detectors, wherein the system further includes AC differential amplifier means for providing separately combining the in-line and quadrature signal pairs; and wherein the means for deriving DC signals representing peak-to-peak values comprises peak detector and filter circuits.

13. The method of controlling a scanning beam relative to a three-dimensional recording pattern extending along a track comprising the steps of:

generating a frequency reference during the scanning, amplitude and phase modulating the frequency reference in correspondence to the extent and sense of the deviation of the scanning beam relative to the track, summing the frequency reference with the frequency and phase modulated reference, extracting the unipolar peak-to-peak values of the frequency reference and the summation respectively, and controlling the scanning with the difference between the peak-to-peak values.

14. The method of controlling a scanning beam relative to a three-dimensional recording pattern comprising the steps of generating a reference frequency signal during the scanning, generating a signal at the reference frequency that is amplitude and phase modulated in accordance with the position relative to the recording pattern, combining the reference frequency signal with the amplitude and phase modulated signal, extracting the unipolar peak-to-peak values of the combined signal and the reference frequency signal and controlling the scanning with the difference between one peak-to-peak value and the other.

15. The invention as set forth in claim 14 above, wherein the reference frequency signal is generated by frequency modulated digital data patterns.

16. The invention as set forth in claim 14 above, wherein the reference frequency signal is generated by high frequency chopping of the scanning beams.

17. The method of providing a tracking control signal while reproducing data recorded in the form of a sequence of periodically related surface deformations along a track on a thermoplastic medium comprising the steps of sensing along the track to generate a first AC signal that is amplitude modulated in correspondence to deformations along the track, concurrently sensing transversely to the track to generate a second AC signal that is amplitude and phase modulated in response to the deformations along the track and the scanning position transversely relative to the track, shifting the phase of one signal by a fixed amount relative to the other signal, summing the first and second AC signals, deriving a first DC signal representative of the amplitude modulation of the summed signals, deriving a second DC signal representative of the amplitude modulation of the first signal, and substracting the second DC signal from the first DC signal to provide a tracking control signal.

References Cited

UNITED STATES PATENTS 3,168,726 2/1965 Boblett ............ 340—173

TERRELL W. FEARS, Primary Examiner

HOWARD L. BERNSTEIN, Assistant Examiner

U.S. Cl. X.R.

96—1; 178—6.6; 346—77